United States Patent [19]

Newton

[11] Patent Number: 5,700,107
[45] Date of Patent: Dec. 23, 1997

[54] METHOD OF SOIL REMEDIATION

[75] Inventor: Jeffrey P. Newton, Ithaca, N.Y.

[73] Assignee: Habour Remediation and Transfer Inc. (HR&T), Toronto, Canada

[21] Appl. No.: 507,002

[22] Filed: Jul. 25, 1995

[51] Int. Cl.$^6$ .................. A62D 3/00; B09C 1/06; B09C 1/08
[52] U.S. Cl. .................. 405/128; 106/705; 106/900; 106/DIG. 1; 405/131; 405/263; 588/205; 588/231; 588/252; 588/256
[58] Field of Search .................. 588/205, 223, 588/224, 231, 252, 256; 405/128, 131, 263, 264; 106/705, 790, 900, DIG. 1; 210/747, 751

[56] References Cited

U.S. PATENT DOCUMENTS

| | | |
|---|---|---|
| 3,720,609 | 3/1973 | Smith et al. . |
| 3,837,872 | 9/1974 | Conner .................. 588/252 |
| 3,984,312 | 10/1976 | Dulin et al. . |
| 4,116,709 | 9/1978 | Chappel .................. 106/DIG. 1 X |
| 4,142,912 | 3/1979 | Young .................. 405/129 X |
| 4,209,335 | 6/1980 | Katayama et al. . |
| 4,224,077 | 9/1980 | Olifer et al. . |
| 4,246,104 | 1/1981 | Schmidt et al. .................. 210/759 |
| 4,353,749 | 10/1982 | Ray et al. . |
| 4,367,986 | 1/1983 | Miyoshi et al. .................. 405/266 |
| 4,601,832 | 7/1986 | Hooykaas .................. 210/717 |
| 4,615,809 | 10/1986 | King .................. 588/252 X |
| 4,855,083 | 8/1989 | Kagawa et al. .................. 210/751 X |
| 4,950,309 | 8/1990 | Schulz . |
| 5,037,479 | 8/1991 | Stanforth .................. 106/691 |
| 5,193,936 | 3/1993 | Pal et al. .................. 405/128 |
| 5,202,033 | 4/1993 | Stanforth et al. .................. 210/747 |
| 5,238,583 | 8/1993 | Fortson .................. 210/751 |
| 5,276,255 | 1/1994 | Stark .................. 588/257 |
| 5,277,826 | 1/1994 | Burns et al. .................. 210/751 |
| 5,304,706 | 4/1994 | Hooykaas .................. 588/252 |
| 5,330,658 | 7/1994 | Grant et al. .................. 210/717 |
| 5,347,077 | 9/1994 | Hooykaas et al. .................. 588/257 |
| 5,372,729 | 12/1994 | Hooykaas .................. 588/256 X |
| 5,376,283 | 12/1994 | Hooykaas .................. 210/751 |
| 5,397,478 | 3/1995 | Pal et al. .................. 210/710 |
| 5,429,751 | 7/1995 | Hooykaas .................. 210/751 |
| 5,430,235 | 7/1995 | Hooykaas et al. .................. 405/128 X |
| 5,434,333 | 7/1995 | Jantzen et al. .................. 588/252 X |

FOREIGN PATENT DOCUMENTS 0157749  10/1985  European Pat. Off. .

OTHER PUBLICATIONS

Nriagu, Lead Orthophosphates; Solubility and Hydrolysis of Secondary Lead Orthophosphate; *Inorganic Chemistry*, vol. 11, No. 10, 1972.

Ruby et al., In Situ Formation of Lead Phosphates in Soils as a Method to Immobilize Lead; *Environmental Science and Technology*, vol. 28, No. 4, 1994, pp. 646–654.

Ma et al., In Situ Lead Immobilization by Appatite, *Environmental Science and Technology*, vol. 27, No. 9, 1993, pp. 1803–1810.

McGraw–Hill Encyclopedia of Science and Technology, 1971 Ed., pp. 733–734.

*Primary Examiner*—George A. Suchfield
*Attorney, Agent, or Firm*—Hoffmann & Baron LLP

[57] ABSTRACT

A method of remediating soil contaminated with inorganic and organic pollutants as disclosed. A method comprises treating the soil with a complexing agent capable of chelating the pollutants and a matrix-generating agent for authigenically generating within the soil an alumino-silicate colloid matrix. The matrix has a plurality of reactive sites, which are capable of physically and chemically altering the pollutants into innocuous forms. The matrix-generating material comprises a mixture of a cement, blast furnace slag, fly ash, organophilic clay, and a free radical generator.

16 Claims, No Drawings

METHOD OF SOIL REMEDIATION

FIELD OF THE INVENTION

The present invention relates to a method of treating material contaminated with organic and inorganic pollutants, to render the material non-hazardous. In one embodiment, the present invention relates to a method of remediating soil contaminated with inorganic and organic pollutants.

BACKGROUND OF THE INVENTION

There is now an increased awareness of the potential hazard posed to the environment by contaminated materials, such as soil, sediments and sludges. Such soils may be contaminated as a result of spills of hazardous chemicals and materials, through leakage from storage tanks or previous dumping of hazardous materials onto the ground. Similarly, sediments, such as harbour dredging sediments, and sludges, such as water treatment or sewage purification sludges, may contain inorganic pollutants, such as heavy metals, and organic pollutants such as tars and like substances.

Contaminated soils, sediments or sludges have been traditionally treated by encapsulation or immobilization processes. With such processes, the contaminated soil is mixed with an inorganic binder, usually a cement-based material. The soil and contaminants contained therein are in effect encapsulated by the cement, and the resulting mixture solidified and allowed to harden into a rock-like end product. The amount of cement binder that is usually necessary to obtain this hardened end product is 50–100% by weight of the contaminated soil. Often various additives have been added to the binder, in an attempt to increase the efficacy of the binder. The solidified material is usually disposed of in a landfill site, although occasionally it is used for construction fill.

Such encapsulation or immobilization processes have been used since the 1970s, on the belief that, once bound within the cement material, the contaminants could not leach out into the surrounding environment. This belief was based on test results from various procedures such as acid and water leaching of crushed and uncrushed samples of the hardened material. Recent studies have shown that this belief is incorrect, and that in fact the toxic contaminants will leach out of a cement binder after a number of years. Accordingly, in addition to the inefficiencies of having to transport the solidified soil or other material to a landfill site, it is now apparent that such a solidification process does not provide a long term solution to contaminated soils.

SUMMARY OF THE INVENTION

It is an object of the present invention provide an improved method of treating material contaminated with pollutants, such as organic and inorganic pollutants. In one aspect, it is an object of the present invention to provide an improved method for remediating soil contaminated with such pollutants.

It is a further object of the present invention to provide a method of treating material contaminated with pollutants, in which the pollutants can be chemically altered into ecologically inert compounds, so that the treated material can pass appropriate regulatory standards.

It is a further object of the present invention to provide a method of remediating contaminated soil wherein the treated soil has a soil-like or friable consistency, and in which the treated soil can be left in-situ, alleviating the need for disposal of the treated soil in a landfill or similar site.

These and other objects of the present invention are accomplished by providing a method of remediating soil containing organic and inorganic pollutants comprising contacting the soil with a chelating agent and a matrix-generating agent adapted to authigenically generate within the soil a silicate matrix, the matrix having a plurality of catalytically active reactive sites adapted for bonding of the pollutants, and intimately mixing the chelating agent and the matrix-generating agent with the contaminated soil.

In accordance with a further aspect of the present invention, there is provided a method of treating material contaminated with organic and inorganic pollutants, the method comprising providing material contaminated with pollutants, contacting the material with a matrix-generating agent capable of forming with the material an aluminosilicate matrix, intimately mixing the material and the matrix-generating agent, and maintaining the temperature the resultant mixture at a level sufficiently high for a sufficient period to produce kerogenic compounds within said mixture.

DETAILED DESCRIPTION OF THE PREFERRED EMBODIMENTS

The present invention relates to a method of treating material contaminated with organic and inorganic pollutants. The method of the present invention may be used against organic pollutants, such as PCBs, polyaromatic hydrocarbons, pesticides, herbicides, insecticides and related compounds, halogenated solvents, furans, volatile hydrocarbons such as benzene, toluene, and xylene, and other common organic contaminants. The material to be treated may also be contaminated with inorganic pollutants including heavy metals, such as lead, cadmium, mercury, chromium, vanadium, and also radioactive elements, such as uranium, strontium, thorium, and other actinides, and substances containing such radioactive elements, such as radioactive iodine. In one embodiment, the present invention relates to a method of remediating contaminated soil. As used herein, the term soil includes sediments, sludges and other similar materials.

In one embodiment, the method of the present invention comprises treating contaminated soil with a chelating agent and a matrix-generating agent adapted to authigenically generate a silicate matrix within the soil. The chelating agent forms chelates with the inorganic pollutants and with the metal ions present in the soil. The chelating agents useful in the present invention include phosphoric acid, citric acid, trisodium phosphate and trisodium polyphosphate. The level of addition of the chelating agent to the contaminated soil, based on the weight of the contaminated soil, is between about 0.1 percent and about 1.0 percent based on 100 percent active chelating agent, and preferably is from about 0.3 to about 0.6 percent. (All percentages listed herein are on a weight basis.)

The contaminated soil is also treated with a matrix-generating agent. The matrix-generating agent is adapted to authigenically generate a silicate matrix within the contaminated soil. Such a matrix has a plurality of catalytically active reactive sites adapted for chemically or physically bonding the pollutants to the matrix. Preferably, the matrix-generating agent comprises from about 40 percent to about 80 percent cement, most preferably about 50 percent cement. While the cement can be any standard cement, ordinary Portland cement is effective. The matrix-generating agent also contains a silicon-rich component, such as blast furnace slag, basalt, fly ash, and mixtures thereof. The matrix-generating agent comprises from about 20 to about 60 percent silicon-rich component.

The matrix-generating agent is added to the contaminated soil at a level from about 2 percent to about 25 percent by weight of the soil, based on 100 percent active. If the soil is contaminated with only inorganic pollutants, such as heavy metals, the matrix-generating agent is preferably added to the soil at a level of from about 2 percent to about 5 percent by weight of the contaminated soil. If the soil is contaminated with organic pollutants or mixed organic and inorganic pollutants, it is preferable that the matrix-generating agent be added at a level of from about 5 percent to about 25 percent by weight of the contaminated soil, most preferably from about 15 percent to about 20 percent by weight of the contaminated soil.

As is known, cements contain small amounts of metal oxides, particularly calcium oxide and magnesium oxide. Such metal oxides contained within the cement react with water and moisture present within the soil to form oxyhydroxides. Such oxyhydroxides are highly reactive, and it is believed that the oxyhydroxides react with the silicon dioxide contained in the silicon-rich component, and in the soil, to produce a crystalline silicate matrix, the matrix having a sponge-like structure containing numerous reactive pores and channels. The matrix has a plurality of catalytically active reactive sites that are created by the incorporation of the metal oxides into the matrix. The local acidity of these sites is very high, greater than that of sulphuric acid. The reactive sites can therefore transform the pollutants into innocuous compounds, by forming stable organometallic complexes.

Soil remediated with the process of the present invention either retains its original consistency or has a friable consistency, that is the treated soil may be easily crumbled into small soil-like particles. As used herein the term "at least friable consistency" includes both a friable consistency and retention of the soil's original consistency after treatment with the method of the present invention. Should the method of the present invention be used to treat liquid waste as described below, the contaminants will in effect flocculate out of the liquid and the flocculates will also have an at least friable consistency. With such a consistency, the treated soil can be left in situ, or can be used for engineered or construction fill, for roads, building foundations and the like.

In the method of the present invention, it is believed that the cement component of the matrix-generating agent does not hydrate to form a hard end product, but rather that the cement is restructured into a clay-like material, giving the generated matrix its at least friable consistency.

Further, soil remediated with the method of the present invention generally meets regulatory standards, and is often classified as non-hazardous. Accordingly, the present invention provides an economical method of treating contaminated soil.

For a soil contaminated with organic pollutants, it is preferable that the matrix-generating agent also include an organophilic clay. Such organophilic clays are commercially available, and generally have been modified by the substitution of quaternary ammonium compounds, in particular alkylammonium compounds. The organophilic clays useful include appropriately modified smectite, bentonite and hectorite clays. Preferably, the matrix-generating agent comprises from about 1 to about 5 percent organophilic clay.

The matrix-generating agent may also include compounds capable of initiating or sustaining free radical reactions within the generated matrix. Such free radical compounds become chemically embedded within the matrix, and function as additional reactive sites for bonding with the pollutants. Such free radical compounds include salts of transition metals, such as sulphates or chlorides of iron, manganese, copper, aluminum, zinc, or molybdenum. Preferably, the matrix-generating agent comprises from about 3 to about 10 percent free radical compounds, most preferably from about 5 to about 7 percent free radical compounds.

The matrix-generating agent may also include an oxidizing agent, to assist in oxidizing the pollutants, in particular organic pollutants. Oxidizing agents useful in the present invention include the sodium or potassium salts of permanganate, chlorate or persulfate, calcium peroxide, hydrogen peroxide, and the like. Preferably, the matrix-generating agent comprises from about 1 to about 3 percent oxidizing agent.

The matrix-generating agent may also include a metal oxide, such as an oxide of manganese, aluminum, titanium, or molybdenum. It is believed that the addition of such a metal oxide increases the number of catalytically active reactive sites within the matrix, which leads to higher levels of reduction of the pollutants. Preferably the matrix-generating agent comprises from about 0.3 to about 5 percent metal oxide, most preferably from about 1 to about 3 percent oxidizing agent.

The method of the present invention may also include the use of an aprotic solvent, such as dimethyl sulfoxide. Preferably, the aprotic solvent is mixed with the chelating agent, and is added to the contaminated soil at an addition level of from about 1 to about 3 percent by weight of the contaminated soil.

If the organic pollutants are in the form of micelles or colloids, surfactants may can be added to the contaminated soil, at an addition level of from about 1 to about 3 percent by weight of the contaminated soil. Preferably, the surfactant is a non ionic or anionic surfactant. Further, a solvent such as propyl or butyl alcohol can be added to the matrix-generating agent, at an addition level of from about 1 to about 3 percent by weight of the contaminated soil. Such surfactants or solvents may be added to the contaminated soil in a pretreatment step, prior to the addition of the chelating and matrix-generating agents. Alternatively, the surfactants or solvents may be mixed with the complexing agent.

In the method of the present invention, the chelating agent and the matrix-generating agent may be premixed together prior to addition to the contaminated soil, or the chelating agent and the matrix-generating agent may be added sequentially to the contaminated soil. Preferably, the chelating agent and the matrix-generating agent are added sequentially, with the complexing agent being added first.

Most preferably, an aqueous solution of the chelating agent is first added to and thoroughly mixed with the contaminated soil, followed by the addition of a slurry of the matrix-generating agent. The slurry preferably contains from about 30 percent to about 60 percent water, depending primarily on the water content of the soil. The slurried matrix-generating agent is then thoroughly mixed with the contaminated soil.

The chelating agent and the matrix-generating agent may be mixed with the contaminated soil by any method applicable for the intimate mixing of such materials, such as a screw auger, pug mill, and similar known techniques. If it is desired to remediate a large mass of contaminated soil in-situ, the chelating and matrix-generating agents may be mixed together with the soil by drilling, using a screw auger or injection mixing drill, a plurality of closely spaced drill holes, such that the soil in each drill hole is slightly displaced, to allow for complete mixing of the reagent with the soil. Also, using the method of the present invention, the contaminated soil may be excavated and conveyed to a central mixer at the contaminated site, and the treated soil then reconveyed to its original location or an alternative location.

It has surprisingly been found that the use of a combination of a chelating agent and a matrix-generating agent as described above to treat contaminated soil results in higher levels of contaminant reduction than that possible by either the chelating agent or the matrix-generating agent alone, often as much as 40% higher. It is believed that the chelates formed are more readily incorporated within the matrix, and result in the mineralization of inorganic contaminants. Because of this high level of contaminant reduction, the treated soil can often be classified as non-hazardous, and can be used for construction fill and similar purposes.

In a further aspect, the present invention relates to a method of treating material contaminated with organic and inorganic pollutants, the method comprising providing a material with pollutants, contacting the material with a matrix-generating agent as described above, intimately mixing the matrix-generating agent and the material, and heating the resultant mixture to temperature sufficiently high for a sufficient period to produce kerogen or kerogen-like compounds within the mixture.

Such kerogen-like or kerogenic structures are large organic geopolymers of no particular order. Kerogenic compounds have an irregular structure, comprising both aliphatic and aromatic constituents. Because of this structure, kerogens are capable of trapping within them smaller organic and inorganic molecules. The kerogenic compounds are formed by polycondensation reactions occurring at the reactive sites within the matrix, and the kerogens then become chemically bonded to the matrix. Kerogens are generally insoluble in both water and most organic solvents, and hence their formation is a highly effective method of remediating contaminated soil.

In order to form such compounds, the temperature of the contaminated material should be at least about 35° C. for a period of several days, two to three days usually being sufficient. While the temperature of the contaminated material can be maintained at this elevated level by use of electric heaters or heated gas, it has been found that with the method of the present invention, such temperatures can be maintained with a sufficient mass of the contaminated material by using the heat generated by the redox reactions occurring at the reactive sites. The cumulative heat generated from the redox reactions assists the endothermic cracking and polymerization reactions to achieve a greater degree of completion. While the mass necessary to maintain such a temperature depends on the concentration of organics in the contaminated material, the mass of the contaminated material should be at least about 200 kg to ensure that formation of kerogenic compounds occurs.

It has been found that liquid wastes, for example liquid wastes generated from drum reprocessing, can be effectively treated with the method of the present invention. If the contaminated material is a liquid, the matrix-generating agent should contain an organophilic clay as described above. It has been found that by using the method of the present invention to treat such contaminated liquid, the end products of the present invention are a non-hazardous liquid effluent and an at least friable soil-like material, which can also be classified as non-hazardous.

The method of the present invention results in a chemical restructuring or reordering of the soil being treated. As indicated above, the method of the present invention authigenically generates an alumino-silicate matrix, having a colloidal structure. Such catalytically enriched aluminosilicate structures have a high number of reactive pores and channels, resulting in a matrix having a high porosity. The matrix has a plurality of catalytically active reactive sites adapted to render the pollutants into an innocuous form. These sites are both physically and chemically active. Within the matrix, a variety of reaction mechanisms, including hydrogen bonding, coordination complexing, Lewis acid/base formation, covalent bonding, P$\pi$ to d$\pi$ bonding, are present. Such mechanisms break down the organic pollutants into environmentally benign forms.

With material contaminated with organic pollutants, or mixed organic and inorganic pollutants, it is believed that the reaction steps of the method of the present invention are as follows. The free radical generators attack the organic contaminants to form organic free radical compounds. These organic free radicals then combine, by a polymerization-type reaction, to create long chain organic compounds. These long chain compounds then combine, by condensation polymerization, to form kerogen and kerogen-like compounds.

With the method of the present invention, inorganic pollutants, such as heavy metals, are initially drawn into the generating matrix, and can subsequently be utilized as secondary catalytic materials, i.e. as further reactive sites. The inorganic pollutants are then mineralized, into a non-reactive, non-leachable state.

The invention will be further described in connection with the following examples which are set forth for the purpose of illustration only.

EXAMPLE 1

A soil contaminated with in excess of 60,000 ppm lead with an untreated TCLP leach value of in excess of 1,200 ppm was treated as follows.

A 3 percent w/w solution of phosphoric acid was added to the contaminated soil at an addition level of 10 percent by weight of soil. A matrix-generating agent comprising 50 percent Portland cement and 50 percent blast furnace slag was added to and thoroughly mixed with the soil at the addition rate of 3 percent by weight of contaminated soil. After three days cure time, the treated soil had TCLP leach value of less than 0.5 ppm, well below the level required by government regulation. It is believed that the lead was transformed into a highly insoluble pyromorphite material.

EXAMPLE 2

Two samples of a soil contaminated with 3,900 ppm mixed PCBs were treated as follows.

Sample A was treated with 15 percent by weight of the contaminated soil of a matrix-generating agent having the following composition:

| Ingredient | Percent |
| --- | --- |
| Portland cement | 49 |
| blast furnace slag | 35 |
| magnesium oxide | 1 |
| ferric sulphate | 4 |
| manganese sulphate | 3 |

-continued

| Ingredient | Percent |
|---|---|
| organophilic clay | 4 |
| sodium persulfate | 4 |

Sample B was initially treated with 5 percent by weight of soil of a 10 percent phosphoric acid solution, followed by treatment with the matrix-generating agent of Sample A, at an addition level of 15 percent.

The treated samples were then analyzed by GC/MS methods. After three days cure time, sample A contained 1,400 ppm PCBs while sample B contained only 870 ppm PCBs.

EXAMPLE 3

An organic coal gasification waste sludge containing high concentrations of volatile compounds, including benzene, chlorobenzene, toluene, xylene, and polyaromatic hydrocarbons was treated with the matrix-generating agent of Example 2 at an addition rate of 18 percent by weight of soil.

Both a 1 kg bench scale sample and a 10 tonne sample were treated as above. The solvent extraction results of the large sample had over 90 percent improvement in results, with the addition of 25 percent less complexing and matrix-generating agents than for the 1 kg sample. Further, the large sample reached a temperature of 70° C. within hours, and this temperature was sustained for approximately four days. The temperature of the 1 kg sample reached only slightly above ambient.

I claim:

1. A method of remediating soil contaminated with organic and/or inorganic pollutants, the method comprising contacting the soil with a complexing agent and a matrix-generating agent capable of authigenically generating within the soil a silicate matrix the matrix having a plurality of catalytically active reactive sites adapted for bonding of the pollutants, and intimately mixing the complexing agent and the matrix-generating agent with the contaminated soil, wherein the complexing agent is selected from the group consisting of phosphoric acid, citric acid and trisodium phosphate, and the matrix-generating agent comprises a cement and a silicon dioxide rich compound.

2. A method as claimed in claim 1, wherein the silicon dioxide rich compound is selected from the group consisting of blast furnace slag, basalt, fly ash and mixtures thereof.

3. A method as claimed in claim 1, wherein the matrix-generating agent further comprises, from about 1 percent to about 5 percent organophilic clay, based on the weight of the contaminated soil.

4. A method as claimed in claim 1, wherein the complexing agent is added to the soil at a level of from about 0.3 percent to about 0.6 percent by weight of the contaminated soil and the matrix-generating agent is added to the soil at a level of from about 2 percent to about 10 percent by weight of contaminated soil.

5. A method as claimed in claim 1, further comprising adding from about 0.5 percent to about 5 percent by weight of contaminated soil of an aprotic solvent.

6. A method as claimed in claim 1, wherein the matrix-generating agent further comprises a free-radical generating compound, said free-radical generating compound being selected from the group consisting of sulphate and chloride salts of transition metals.

7. A method as claimed in claim 6, wherein the matrix-generating agent further comprises a metal oxide selected from the group of oxides of manganese, aluminum, titanium, and molybdenum, the metal oxide being added at a level of from about 1 to about 3 percent by weight of contaminated soil.

8. A method of treating material contaminated with organic pollutants, the method comprising providing material contaminated with organic pollutants, contacting the material with a matrix-generating agent capable of generating with the material a catalytically active alumino-silicate matrix, intimately mixing the material and matrix-generating agent, and maintaining the temperature of the resultant mixture at a level sufficiently high for a sufficient period to produce kerogenic compounds within said mixture.

9. The method of claim 8 further comprising intimately mixing the material with a complexing agent.

10. The method of claim 9, wherein the complexing agent is in an aqueous solution and the matrix-generating agent is slurried with water, and the complexing agent is added to the contaminated material prior to the addition of the matrix-generating agent.

11. The method of claim 10, wherein the matrix-generating agent comprises a cement, a silicon-dioxide rich component, an organophilic clay and the matrix has an at least friable consistency.

12. The method of claim 11 wherein the matrix-generating agent further comprises from about 1 percent to about 3 percent by weight of contaminated material of a free radical generator selected from the group consisting of sulphate and chloride salts of transition metals.

13. A method of remediating soil contaminated with mixed organic and inorganic pollutants, the method comprising contacting the soil with a complexing agent selected from the group consisting of phosphoric acid, citric acid, trisodium phosphate and trisodium polyphosphate, and a matrix-generating agent comprising a cement, a silicon dioxide rich component and an organophilic clay, intimately mixing the complexing agent and the matrix-generating agent with the soil to produce a silicate matrix capable of binding with the pollutants, the matrix having an at least friable consistency.

14. A method as claimed in claim 1, wherein the complexing agent is mixed with the contaminated soil prior to the matrix-generating agent being mixed with the contaminated soil.

15. A method as claimed in claim 14, wherein the complexing agent is in aqueous solution and a slurry of the matrix-generating agent is formed prior to mixing with the contaminated coil.

16. A method of remediating soil contaminated with organic or inorganic pollutants, the method comprising contacting the soil with a complexing agent and a matrix-generating agent capable of authigenically generating within the soil a silicate matrix, the matrix having a plurality of catalytically active sites adapted for bonding of the pollutants, and intimately mixing the complexing agent and the matrix-generating agent with the contaminated soil to thereby authigenically generate said silicate matrix and bond said pollutants at said catalytically active sites in said matrix.

* * * * *